Dec. 12, 1967 K. HILLMAN 3,358,242

AUTOMATIC PHASE CONTROL NETWORK

Filed April 29, 1966 2 Sheets-Sheet 1

INVENTOR.
KURT HILLMAN
BY R. J. Frank
ATTORNEY.

Dec. 12, 1967 K. HILLMAN 3,358,242

AUTOMATIC PHASE CONTROL NETWORK

Filed April 29, 1966 2 Sheets-Sheet 2

INVENTOR.
KURT HILLMAN
BY R. J. Frank
ATTORNEY.

United States Patent Office 3,358,242
Patented Dec. 12, 1967

3,358,242
AUTOMATIC PHASE CONTROL NETWORK

Kurt Hillman, Flushing, N.Y., assignor to General Telephone & Electronics Laboratories Incorporated, a corporation of Delaware Filed Apr. 29, 1966, Ser. No. 546,401
12 Claims. (Cl. 331—26)

ABSTRACT OF THE DISCLOSURE

An automatic phase control network utilizing a phase bridge and a square-wave local oscillator wherein signals of constant opposite polarity containing the timing information are supplied to the first and second input terminals of the phase bridge. The phase bridge contains a number of diodes coupled between its first and second input terminals so that the transition of the local square wave signal supplied to the third terminal changes the polarity of the phase bridge output. When the square wave transition occurs at the peak of the incoming signal, the net output signal of the phase bridge is zero indicating that the local oscillator is in phase with the received signal.

This invention relates to an automatic phase control (APC) network and more particularly to a phase bridge for use therein.

The increasing interest in the use of pulse code modulation (PCM) techniques in telephony and telemetry has resulted in the need for timing networks capable of preserving the repetition rate of the coded pulses. Briefly, PCM signals are provided by sampling an analog signal, typically an audio signal, at a pre-determined rate, quantizing this signal sample by comparing it with a step waveform and assigning to it a digital value corresponding to the nearest step. The transmitted signal is the pulse coded magnitude of this digital value.

The sampling of the analog signal in accordance with the well-known Shannon's Sampling Theorem ensures that the signal may be reconstructed at the receiver without substantial distortion. The use of sampling techniques enables digital information characterizing the signal sample to be transmitted in a fraction of the time that the analog signal exists. Since each signal sample is represented by the presence or absence of pulses during a relatively short fixed interval, a single communications channel is capable of handling a large number of independent signals when the corresponding intervals containing pulses are interleaved in time. As a result of this time-sharing the utilization of the information-carrying capacity of transmission facilities (e.g. telephone cables) may be increased significantly.

The transmitted signals consist only of pulses so that the receiver need only recognize the presence or absence of a pulse at a particular point in time. However, the time interval for each signal and the timing of the pulses therein must be preserved during transmission to enable each independent signal to be accurately reconstructed. In practice, the attenuation suffered by the PCM signals while traveling along their transmission path is limited by the use of repeaters periodically disposed in the path.

A repeater amplifies and retransmits the received pulses so that they may be recognized as such when arriving at the receiver. In addition, the repeater must transmit amplified pulses which have the same timing relationship as the original transmitted pulses. To insure that the repeater output pulses have this timing relationship, the repeater extracts timing-wave information from the incoming pulses.

The timing-wave information is used to adjust the frequency of a local oscillator so that it is in phase with the incoming pulses. The local oscillator signal is supplied to a pulse regenerator wherein the concurrence of an incoming pulse is required to provide an output pulse. The timing-wave information may be extracted from the incoming pulses by an automatic phase control network which through the use of a feedback loop compares the phase of the output of the local oscillator and adjusts the oscillator to provide phase alignment.

The PCM signal arriving at the repeater is normally supplied to a pre-amplifier which provides both gain and equalization to compensate for the normally poor high-frequency response of the transmission path. The waveform of the pre-amplified signal contains not only the individual pulse waveforms but additional noise signal waveforms superimposed thereon. One prevalent source of the noise signal is termed near-end cross-talk (NEXT) and is due to the capacitive coupling between individual transmission paths. The effects of NEXT may be quite severe since the incoming signals are relatively weak while the repeated signals on other transmission paths traveling in the opposite direction are relatively strong having been previously regenerated. As a result, the waveform of the incoming signal to be used for phase comparison may be substantially distorted at a particular point in time due to the cross-coupling of NEXT impulse noise.

Although improvement may be obtained by removing or clipping out the lower portion of the incoming signal to remove the noise occurring during that portion of the waveform, noise occuring during the remaining portion is still present. As a result, phase bridges normally employed in repeaters are unable to repeatedly locate the center of the PCM signal and provide the required control for the local oscillator. Phase bridges previously employed have relied on the performance of a nonlinear operation on the incoming signal, e.g., differentiation, or the selection of a discrete portion of the signal to perform the phase comparison. This type of phase bridge utilizing narrow signals to perform the phase comparison, reduces the immunity of the APC network to noise occurring during the selected portion of the waveform since the noise may have sufficient amplitude and appropriate polarity to obliterate the narrow signal.

In practice, repeaters have employed a passive tuned circuit for regenerating the timing wave. The tuned circuit has been utilized due to its ability to perform the timing wave extraction with a circuit at a relative low cost. The use of an APC network with such a tuned circuit has not been favored due to the added complexity and cost even though the frequency drift of the tuned circuit could be reduced. In part, the added complexity and cost results from the use of phase bridges employing active elements, such as transistors, and from the need for elaborate frequency control circuitry.

The use of a tuned-circuit as the means for delivering the timing-wave signal to the regenerator has been found to necessitate an undesirable compromise in repeater performance. When large gaps develop in the incoming pulse pattern, the energy stored in the tuned circuit decays. This decay is a function of the circuit Q which is proportional to the ratio of the energy stored to the energy dissipated per cycle in the tuned circuit. Although the tuned-circuit losses may be reduced by increasing the Q, the slope of the phase versus frequency characteristic also increases so that a slight mistuning of the circuit due to aging, temperature, or similar effects, results in an unwanted phase shift of the oscillator. This unwanted phase shift reduces the immunity of the incoming signal to interference such as NEXT since the comparison is not taking place at the center of the waveform but at some point of lesser amplitude.

Accordingly, an object of the present invention is the provision of an automatic phase control network having increased immunity to incoming signal noise.

A further object is to provide an APC network wherein substantially the entire signal is utilized for phase comparison.

Another object is to provide a phase bridge wherein the essentially undistorted waveform of an incoming signal is phase compared with a square-wave local signal.

Another object is to provide a phase bridge having increased immunity to incoming signal noise.

Still another object of the invention is to provide a phase bridge of reduced complexity.

In the present invention, an APC network is provided which includes a phase bridge having first, second and third input terminals and an output terminal. The waveform of an incoming signal is applied concurrently to the first and second input terminals with the waveform appearing at the first input terminal. In addition, the waveforms at each terminal are of constant polarity. The input signals to the first and second terminals of the phase bridge may be provided by coupling these terminals to the output terminals of a balanced unipolar converter circuit which provides first and second signals of constant opposite polarity having a waveform similar to that of the incoming signal.

The output terminal of the phase bridge is coupled to the input terminal of a filter. The output terminal of the filter is coupled to the input terminal of a frequency control device. The output of the frequency control device is coupled to the input terminal of a local oscillator. The oscillator has first and second output terminals with the first terminal being coupled to the third input terminal of the phase bridge.

The phase bridge comprises first, second, third, fourth, fifth and sixth asymmetrically conductive means. Each conductive means has first and second electrodes and is poled to pass current from its first to second electrode. In the construction of the bridge, the second electrode of the first means is connected to the second electrode of the second means and is coupled to the third input terminal. The first electrode of the second means is connected to the second electrode of the third means and to a reference potential (i.e. ground). The first electrode of the third means is connected to the first electrode of the fourth means and is coupled to the third input terminal. The second electrode of the fourth means is coupled to the second input terminal and the first electrode of the first means is coupled to the first input terminal.

The first electrode of the fifth means is connected to the first electrode of the first means. The second electrode of the fifth means is connected to the first electrode of the sixth means and the second electrode of the sixth means is connected to the second electrode of the fourth means. The junction of the second and first electrodes of the fifth and sixth means, respectively, is coupled to the output terminal of the phase bridge.

During operation, the local oscillator provides a bipolar output signal characterized by a rapid transition between polarity states and having a nominal frequency which may be varied by the frequency control means. The nominal frequency of the oscillator is such that the corresponding period of the signal is equal to the interval between successive peaks of the input signal. The bipolar signal is typically a square-wave, supplied to the third input terminal of the phase bridge which results in the square-wave being applied concurrently across the second and third conductive means. The second and third conductive means are connected so that only one of said means is rendered conductive by each half of the square-wave. The third means is rendered conductive at the time of the positive-going transition of the square-wave and remains conductive until the negative-going transition whereupon the second means is rendered conductive. In addition, the first electrode of the fourth means is coupled to the first electrode of the third means so that the fourth means is also rendered conductive by the positive half-cycle of square-wave signal. As a result, the second input terminal is coupled to the reference potential during the positive portion of the local oscillator signal. Similarly, the negative half-cycle of the local oscillator signal renders both the first and second means conductive and thereby couples the first input terminal to the reference potential until the positive-going transition occurs.

As mentioned previously, the waveform of the incoming signal is applied to the first input terminal while at the same time it is applied in inverted form to the second input terminal. The waveforms appearing at the first and second input terminals are of constant opposite polarity with the waveform at the first terminal being positive. During the negative half-cycle of the local oscillator signal the third and fourth means are nonconductive while the first and second means are conductive and the first input terminal is coupled to the reference potential.

At this time, the waveform appearing at the second input terminal is negative which renders the sixth means conductive so that this portion of the waveform appears at the phase bridge output terminal. The negative waveform continues to appear at the output terminal until the occurrence of the positive-going transition of the local oscillator signal. The positive-going transition renders the first and second means nonconductive and the third and fourth conductive. This couples the second input terminal to the reference potential and results in the waveform at the first input terminal appearing at the output terminal.

The resultant signal of the phase bridge output terminal is comprised of portions of the signals appearing at the first and second input terminals. If the positive-going transition of the local oscillator signal occurs at the peak of the incoming signal, the signal at the output terminal contains equal portions of the positive and negative waveforms appearing at the first and second input terminals respectively. It shall be noted that the waveform of the incoming signal is essentially undistorted by the phase bridge although a portion of it has been inverted. The total incoming signal and the accompanying noise, including NEXT, appears at the phase bridge output terminal.

When the local oscillator signal is in phase with the incoming signal, the positive-going transition occurs at the peak of the incoming signal waveform. Therefore, the signal appearing at the phase bridge output terminal contains two equal opposite polarity components. If the local oscillator signal leads the incoming signal, the area of the positive component will exceed that of the negative component. Similarly, a lagging oscillator signal increases the area of the negative component at the expense of the positive component.

The phase bridge output terminal is connected to the input terminal of a low-pass filter which integrates the signal and produces a net signal having a magnitude and a polarity which is a function of the difference in phase between the incoming signal and the local oscillator. In the case of phase alignment, wherein the output signal contains two equal opposite polarity components, the net signal appearing at the filter output is zero since the integration of the phase bridge output signal over the corresponding cycle equals zero. The character of the phase bridge output signal enhances the noise performance of the APC network since any noise occurring prior to the peak of the incoming signal is offset by that occurring subsequent thereto. The integration provided by the filter is in effect a comparison of the areas under each component so that the effects of noise in the form of spikes, such as NEXT, is substantially reduced.

The time constant of the filter is chosen to be considerably larger than the period of the incoming signal in order to prevent rapid changes in the filter output signal. The filter output is nominally zero, corresponding to the condition of phase alignment wherein the local oscillator free-running frequency and phase are equal to and in alignment with the incoming signal peak. The filter output signal is applied to the input terminal of the frequency control means which is coupled to and controls the frequency of the square-wave local oscillator. One square-wave crystal oscillator found especially well-suited for use in the present APC network is described in U.S. Patent No. 3,155,921 granted Nov. 3, 1964, to M. Fischman.

The local oscillator is provided with first and second output terminals. The first output terminal is coupled to the third input terminal of the phase bridge to complete the APC network. In the case of a repeater, the second output terminal of the oscillator is differentiated to provide trigger pulses and coupled through an AND circuit to a pulse regenerator.

The phase bridge employed in the present APC network is of reduced complexity and is capable of phase comparing any signal that is substantially symmetrical about its peak with a local square-wave signal. The phase bridge comprised of asymmetrically conductive means utilizes the entire waveform of the incoming signal to perform the phase comparison without introducing any significant losses and the comparison so performed exhibits increased immunity to noise. The APC network insures alignment of the edge of the square wave with the peak of the incoming signal to provide correct placement in time of the local oscillator signal applied to subsequent regenerating means.

Further features and advantages of the invention will become more readily apparent from the following detailed description of a specific embodiment of the invention when viewed in conjunction with the accompanying drawings, in which.

Figure 1:
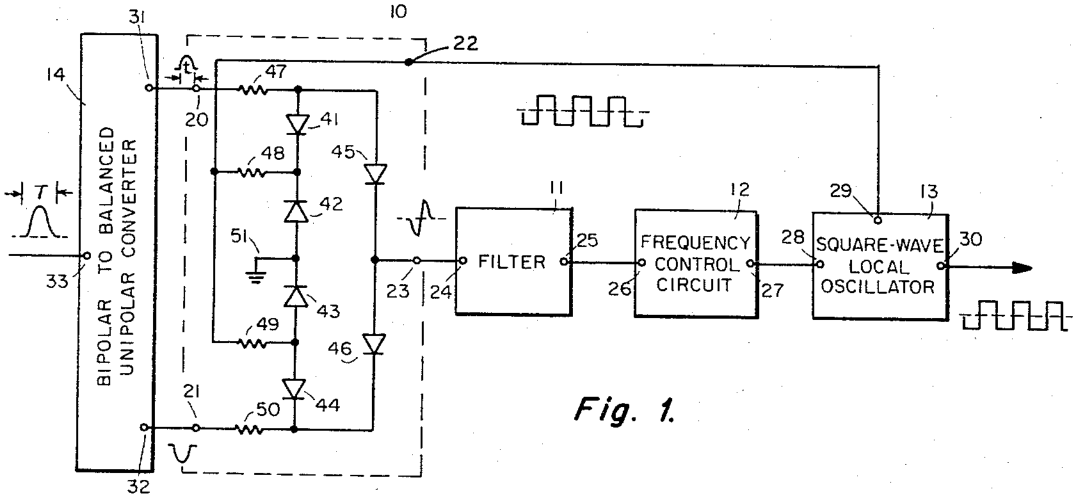
FIG. 1 is a block schematic diagram of one embodiment of the invention.

Referring now to FIG. 1, an automatic phase control (APC) network is shown comprising phase bridge 10 having input terminals 20, 21, 22 and output terminal 23, a filter 11 having input and output terminals 24 and 25 respectively, a frequency control circuit 12 having input and output terminals 26 and 27 respectively, and a square-wave local oscillator 30 having an input terminal 28 and first and second output terminals 29 and 30 respectively.

Input terminals 20 and 21 of phase bridge 10 are connected to output terminals 31 and 32 respectively of a bipolar to balanced unipolar converter circuit 14. The circuit 14 has a single input terminal 33 to which the incoming signal is applied. The converter circuit provides two equal output signals of constant opposite polarity having essentially the same waveform as that of the incoming signal. In this embodiment, the signals appearing at terminal 31 have a positive polarity and are independent of the polarity of the incoming signal. In addition, the converter circuit 14 may be provided with a reverse bias to clip off the lower portion of the incoming signal. When such is the case, a portion of the noise is suppressed without distorting the remaining portion of the waveform of the signal. The waveforms in FIG. 1 indicate the effect of this reverse bias with the signals appearing at terminals 31 and 32 having a waveform similar to that of the incoming signal during the interval *t* although of reduced amplitude. However, in other applications the incoming signal need not be reduced in amplitude, in which case, the signals appearing at terminals 31 and 32 will have a waveform similar to that of the incoming signal during its entire period T.

The positive and negative portions of the balanced output of converter 14 are applied to phase bridge input terminals 20 and 21 respectively. The phase bridge 10 contains four asymmetrically conductive means, 41, 42, 43, and 44, herein referred to as diodes, connected in series. The diodes are each poled to pass current flowing from the first to second electrode and are drawn in the conventional manner. The first electrode of diode 41 is coupled through current limiting resistor 47 to first input terminal 20 and the second electrode of diode 44 is coupled through current limiting resistor 50 to second input terminal 21. In addition, the first and second electrodes of diodes 42 and 43 respectively are coupled to reference potential 51.

The third input terminal 22 of the phase bridge is coupled through current limiting resistor 48 to the second electrodes of diodes 41 and 42. Also, the third input terminal is coupled through current limiting resistor 49 to the first electrodes of diodes 43 and 44. Further, diodes 45 and 46 are connected in series with the first electrode of diode 45 being connected to the first electrode of diode 41 and the second electrode of diode 46 being connected to the second electrode of diode 44. The phase bridge output terminal 23 is connected to the second and first electrodes of diodes 45 and 46 respectively.

The phase bridge output terminal 23 is coupled to the input terminal 24 of low-pass filter 11. Filter 11 in effect integrates the signals appearing at terminal 24 so that the signal appearing at its output terminal 25 is a time-averaged signal. The time-averaged signal is applied to input terminal 26 of frequency control circuit 12 which is coupled through its output terminal 27 to the input terminal 28 of square-wave local oscillator 13. The frequency control circuit, also termed a reactance modulator, adjusts the frequency of the oscillator 13 in accordance with the time-averaged signal.

The local oscillator 13 has first and second output terminals 29 and 30. Output terminal 30 is coupled to a subsequent utilization circuit (not shown) which, in the case of a PCM repeater, may be an AND circuit and a pulse regenerator. Output terminal 29 is coupled to the phase bridge input terminal 22 to provide a feedback path and complete the APC network.

Figure 2:
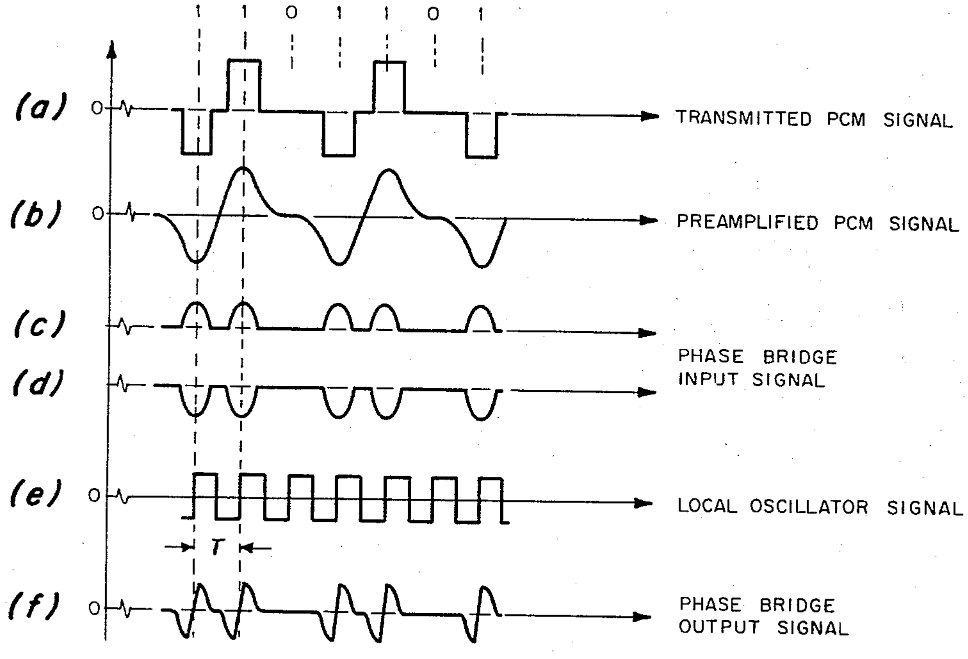
FIG. 2 (*a* to *f*) shows representative waveforms appearing in the embodiment of FIG. 1.

During the normal operation of a repeater containing the APC network, the pulses are degraded in form from the transmitted signal by the attenuation characteristic of the transmission path. The waveform of the received pulses is improved by first amplifying them in a pre-amplifier (not shown) which provides gain and equalization to compensate for the poor high-frequency response of the cable. The shapes of the transmitted PCM signal and the received PCM signal after equalization are shown in *a* and *b* of FIG. 2.

The received preamplified signal is applied to input terminal 33 of converter 14 wherein it encounters a reverse-bias. The reverse bias produces a clipping threshold which removes low-level interference in the absence of a pulse. The converter provides positive and negative signals at its output terminals 31 and 32 respectively regardless of the polarity of the particular preamplified pulse. These signals shown in *c* and *d* of FIG. 2 have essentially the same waveform as the preamplified signal and constitute the phase bridge input signals.

The square-wave signal from local oscillator 13 is applied to input terminal 22. The period T of the square-wave is nominally equal to the interval between successive PCM pulses as shown in *a* of FIG. 2. When the square-wave is negative, diodes 41 and 42 are driven into conduction so that phase bridge input terminal 20 is coupled to reference potential 51 through a low impedance path. At that time, diodes 43 and 44 are reverse-biased by the square-wave whereby the negative waveform at terminal 21 is coupled through diode 46 to output terminal 23. Conversely, when the square-wave is positive diodes 43 and 44 are rendered conductive and couple input terminal 21 to reference potential 51 through a low impedance path. In addition, the positive portion of the square-wave reverse-biases diodes 41 and 42 so that the positive waveform at terminal 20 is coupled through diode 45 to output terminal 23.

The preamplified signal has a waveform that is symmetrical in time about its peak value. This symmetry is maintained as the signal is converted to the balance unipolar phase bridge input signals. Therefore, if the transition of the local oscillator square wave occurs at the peak value of the signal, the positive and negative components contribute equally to the net output signal appearing at terminal 23. The phase bridge output signal is shown in *f* of FIG. 2 as comprising a negative component and a positive component with the transition therebetween occurring at the time of the transition of the square-wave.

Figure 3:
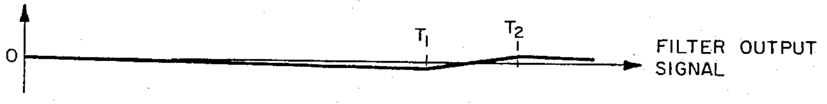
FIG. 3 shows a representative waveform appearing at the output of the filter in FIG. 1.

The phase bridge output signal is supplied to filter circuit 11 which integrates the signal to provide a D-C level output signal, shown in FIG. 3. If the positive and negative components are equal, i.e., the transition of the square-wave coincides with the peak of the input signal, the local oscillator is in phase with the incoming PCM signal. In this case, the time-average signal of filter 11 is zero. However, when the frequency of the local oscillator begins to drift the square-wave no longer is in phase with the incoming signal and the filter output becomes other than zero. The level of the filter output is determined by the time-average of the net phase bridge output signals.

The time constant of filter 11 exceeds the period T between incoming PCM pulses so that the filter output signal is relatively constant over several periods. In practice, the relationship between the time constant and the period T is determined by the particular noise bandwidth desired. For example, a noise bandwidth of 1,000 c./s. was found suitable in one embodiment of the invention. The polarity of the filter output signal is determined by the polarity of the net phase bridge output signal. In FIG. 3, the filter output signal is shown for the condition wherein the local oscillator lags the incoming PCM signal until time $T_1$. During the interval $T_2$–$T_1$, the local oscillator leads the incoming signal so that the net phase bridge signal is positive. Since the time constant of the filter is greater than the period T, the filter output signal does not become positive as soon as the local oscillator signal begins to lead the incoming signal. However, the slope of the filter output signal does change when the phase relationship between the PCM signal and the local oscillator changes.

The filter output signal is applied to input terminal 26 of frequency control circuit 12. The frequency control circuit is coupled to input terminal 28 of square-wave oscillator 13 and varies the oscillator frequency in accordance with the filter output signal. The oscillator output terminal 30 may be coupled to a pulse regenerator, for example a blocking oscillator, to provide the repeated PCM pulses.

The phase bridge 10 utilizes the entire waveform of the signals appearing at its input terminals for the phase comparison. The waveform is divided into two components of opposite polarity by the phase bridge with the magnitude of the net signal indicating the phase difference between the local oscillator and the PCM signal. The polarity of this net signal determines whether it is a leading or lagging phase difference. The use of the entire waveform for phase comparison reduces the vulnerability thereof to noise which otherwise might obliterate narrow incoming signals. In addition, the net phase bridge output signal indicates not only the magnitude of a phase difference but also whether it is a leading or lagging difference.

While the phase bridge is described in connection with a PCM system, the phase bridge may be employed in any system wherein a square-wave is compared with a signal symmetrical about its peak value. The diodes 45 and 46 combine the two components comprising the phase bridge output signal without distorting the waveform and, due to their low impedance, perform the combination in an efficient manner. The diodes also serve to limit the loop gain of the APC network when the incoming signals are very large, since in this case the nonconducting diode does begin to conduct and limit the output signal. In addition, the limiting action of the diodes reduces the effect of large impulse-noise interference. This limiting does not interfere with the normal bridge operation since the nonconducting diode does not load the phase bridge output signal at normal signal levels.

Figure 4:
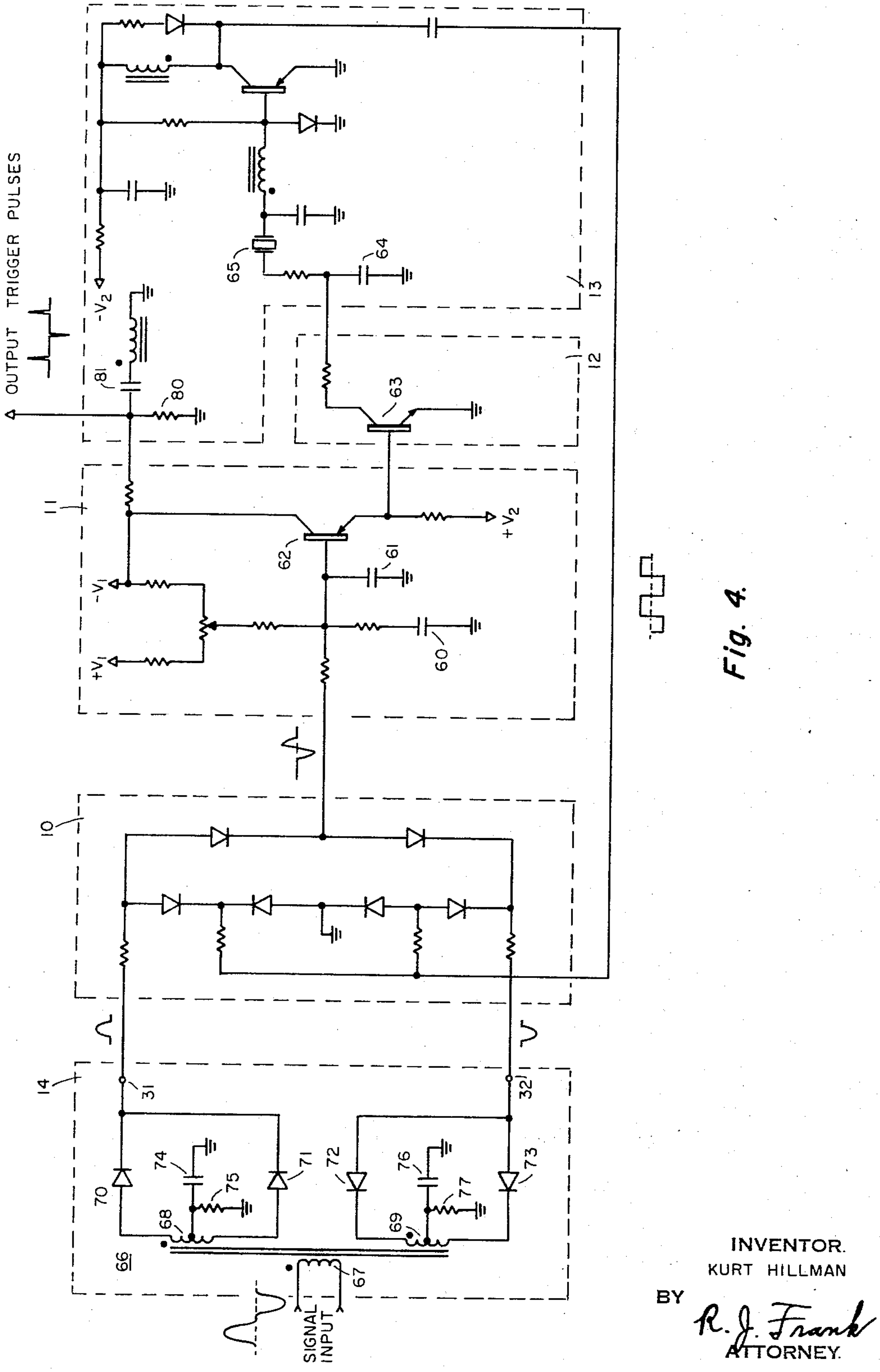
FIG. 4 is an electrical schematic diagram of the embodiment of FIG. 1.

Referring now to FIG. 4, an electrical schematic diagram of an APC network employing a square-wave crystal oscillator 13 of the type described in U.S. Patent No. 3,155,921 to M. Fischman is shown. The output signal of phase bridge 10 is used to control the frequency of this oscillator to insure that the square-wave is essentially in phase with the PCM or phase bridge input signal.

A bipolar output signal of bridge 10 is applied to filter circuit 11 wherein it is integrated over a number of periods T. The time constant of the filter, determined primarily by the product of the capacitor 60 and the effective phase bridge source resistance is preferably many times the period T of the PCM signal. This insures that the D.C. level provided by the filter and shown in FIG. 3 is relatively constant during a given period T. The voltage to which capacitor 60 is charged drives transistor 62, connected as an emitter follower. The capacitor 61 serves to suppress any ripple signals which would otherwise appear at the base of transistor 62.

The emitter follower is coupled to frequency-control transistor 63. It shall be noted that transistors 62 and 63 are of opposite conductivity types to provide cancellation of any emitter-junction voltage changes with temperature. Transistor 63 is connected in parallel with capacitor 64 of local oscillator 13. The output of the filter circuit, i.e., the emitter follower voltage, modulates the conductivity of transistor 63 and varies the effective resistance in parallel with capacitor 64. The frequency of the crystal local oscillator is determined by the series resonant circuit including the capacitor 64 in series with the crystal 65. Varying the effective resistance in parallel with capacitor 64, results in varying the effective capacitance of the capacitor and the frequency of the local oscillator. In the afore-referenced blocking oscillator using a crystal having a resonant frequency of 2.56 mc. and a capacitor 64 of 15 pf., the frequency may be shifted approximately 1,000 cycles.

The bipolar to balanced unipolar converter circuit 14 is shown in FIG. 3 comprising transformer 66 having a primary 67 across which the pre-amplified PCM signals are applied and first and second secondary windings 68 and 69 respectively. Each end of the first secondary winding 68 is coupled through a diode to output terminal 31. It shall be noted that these diodes 70 and 71 are poled in the same direction. The winding 68 is center-tapped to ground through resistor 75 and capacitor 74 connected in parallel. Diodes 70 and 71 serve as rectifiers to insure that the signal appearing at terminal 31 is unipolar regardless of the polarity of the signal appearing across the primary winding. The diodes are reverse-biased by the resistor 75 and capacitor 74 to provide a clipping threshold below which no signal appears at terminal 31. The location of the threshold level is determined primarily by the number and shape of the pulses, and the size of resistor 75, capacitor 74, and the input impedance of the phase bridge. In practice, it has been found preferable to establish the threshold at about one-half the expected peak.

Secondary winding 69 is similar to winding 68 except that diodes 72 and 73 are reversed in polarity with respect to diodes 70 and 71. As a result, the signals appearing at terminal 32 are negative regardless of the polarity of the signal appearing across the primary winding.

The use of a square-wave oscillator in the APC network permits the output trigger pulses supplied to the pulse regenerating means to be developed directly by simple differentiation. To this end, resistor 80 and capacitor 81 are provided in the oscillator output. In addition, the use of an oscillator in the APC network as opposed to a tuned circuit insures that a relatively large signal is supplied to the phase bridge substantially independent of PCM pulse density variations in the incoming signal pattern.

While the above description has referred to a specific embodiment of the invention, it will be recognized that many modifications and variations may be made therein without departing from the spirit and scope of the invention.

What is claimed is:

1. A phase bridge of the type wherein a bipoplar local oscillator signal having a rapid transition between polarity states is phase compared with an input signal, said input signal including first and second waveforms of constant opposite polarity, said phase bridge comprising:

(a) first asymmetrically conductive means having first and second electrodes;

(b) second asymmetrically conductive means having first and second electrodes, said second electrode being coupled to the second electrode of said first means;

(c) third asymmetrically conductive means having first and second electrodes, said second electrode being coupled to the first electrode of said second means;

(d) fourth asymmetrically conductive means having first and second electrodes, said first electrode being coupled to the first electrode of said third means;

(e) fifth asymmetrically conductive means having first and second electrodes, said first electrode being coupled to the first electrode of said first means;

(f) sixth asymmetrically conductive means having first and second electrodes, said first electrode being coupled to the second electrode of said fifth means, said second electrode being coupled to the second electrode of said fourth means;

(g) means for concurrently applying said local oscillator signal across said second and third conductive means, said second and third means being alternately rendered conductive by said local oscillator signal;

(h) means for applying said first waveform across the series combination of said first and second conductive means;

(i) means for applying said second waveform across the series combination of said third and fourth conductive means; and (j) a first output terminal coupled to the junction of the second and first electrodes of said fifth and sixth means respectively, the signal appearing at said output terminal including portions of said first and second waveforms, said portions being equal when a transition of said bipoplar local oscillator signal is in phase alignment with the peak of said input signal and unequal when said local oscillator signal transition is not in phase alignment with said input signal peak.

2. Apparatus in accordance with claim 1 in which each of said asymmetrically conductive means is a diode poled to pass current flowing from its first electrode to its second electrode.

3. Apparatus in accordance with claim 2 in which means for concurrently applying said local oscillator signal across said second and third conductive means comprises a square-wave local oscillator having a first output terminal, said first output terminal being coupled to the second electrode of said second means and the first electrode of said third means, said signal having a nominal period equal to the interval betwen seuccessive peaks of said input signal, and further comprising means for coupling the first electrode of said second means and the second electrode of said third means to a reference potential.

4. Apparatus in accordance with claim 3 further comprising a low-pass filter having an input terminal and an output terminal, said input terminal being coupled to said first output terminal, the signal appearing at the output terminal of said filter having a magniude and a polarity which is a function of the difference in phase between said local oscillator and input signals.

5. Apparatus in accordance with claim 4 further comprising a frequency control circuit having an input and an output terminal, said input terminal being coupled to the output terminal of said filter, said output terminal being coupled to said local oscillator, the frequency control circuit varying the frequency of the local oscillator in accordance with the signal from said filter.

6. Apparatus in accordance with claim 5 further comprising a converter circuit having an input terminal and first and second output terminals, said input signal being applied to said input terminal, said converter providing first and second waveforms of constant opposite polarity at said first and second output terminals respectively, said waveforms being substantially identical with the waveform of the input signal, said first output terminal being coupled to the first electrode of said first means, said second output terminal being coupled to the second electrode of said fourth means.

7. A phase bridge of the type wherein a bipolar local oscillator signal having a rapid transition between polarity states is phase compared with an input signal, said input signal including first and second waveforms of constant opposite polarity, said phase bridge comprising (a) a first diode having first and second electrodes;

(b) a second diode having first and second electrodes, said second electrode being coupled to the second electrode of said first diode;

(c) a third diode having first and second electrodes, said second electrode being coupled to the first electrode of said second diode and to a reference potential;

(d) a fourth diode having first and second electrodes, said first electrode being coupled to the first electrode of said third diode;

(e) first and second input terminals to which said first and second waveforms respectively are applied, said first input terminal being coupled to the first electrode of said first diode, said second input terminal being coupled to the second electrode of said fourth diode;

(f) a third input terminal coupled to the second electrode of said second diode and to the first electrode of said third diode, said local oscillator signal being applied to said third input terminal whereby said signal is concurrently applied across said second and third diodes;

(g) a fifth diode having first and second electrodes, said first electrode being coupled to the first electrode of said first diode;

(h) a sixth diode having first and second electrodes, said first electrode being coupled to the second electrode of said fifth diode, said second electrode being coupled to the second electrode of said fourth diode; and (i) a first output terminal coupled to the junction of said second and first electrodes of said fifth and sixth diode respectively, the signal appearing at said output terminal including portions of said first and second waveforms, said portions being equal when a transition of said bipolar local oscillator signal is in phase alignment with the peak of said input and unequal when said local oscillator signal transition is not in phase alignment with said input signal peak.

8. Apparatus in accordance with claim 7 further comprising (a) first current limiting means coupled in series with said first input terminal and the first electrode of said first diode;

(b) second current limiting means coupled in series with said second input terminal and the second electrode of said fourth diode; and (c) third current limiting means coupled between said third input terminal and the second and first electrodes of said second and third diodes respectively.

9. Apparatus in accordance with claim 8 further comprising a low-pass filter having an input terminal and an output terminal, said input terminal being coupled to said first output terminal, the signal appearing at the output terminal of said filter having a magnitude and a polarity which is a function of the difference in phase between said local oscillator and input signals.

10. Apparatus in accordance with claim 9 further comprising a square-wave local oscillator having a first output terminal, said first output terminal being coupled to said third input terminal, the square-wave signal having a nominal period equal to the interval between successive peaks of said input signal.

11. Apparatus in accordance with claim 10 further comprising a frequency control circuit having an input and an output terminal, said input terminal being coupled to the output terminal of said filter, said output terminal being coupled to said local oscillator, the frequency control circuit varying the frequency of the local oscillator in accordance with the signal from said filter.

12. Apparatus in accordance with claim 11 further comprising a converter circuit having an input terminal and first and second output terminals, said input signal being applied to said input terminal, said converter providing first and second waveforms of constant opposite polarity at said first and second output terminals respectively, said waveforms being substantially identical with the waveform of the input signal, said first output terminal being coupled to said first input terminal and said second output terminal being coupled to said second input terminal.

References Cited

UNITED STATES PATENTS 2,900,534 8/1959 Chater ............ 307—88.5

ROY LAKE, *Primary Examiner.*

S. GRIMM, *Assistant Examiner.*